INVENTORS,
ELLSWORTH W. CARROLL.
HERBERT E. METCALF.
BY
Lippincott & Metcalf
ATTORNEYS.

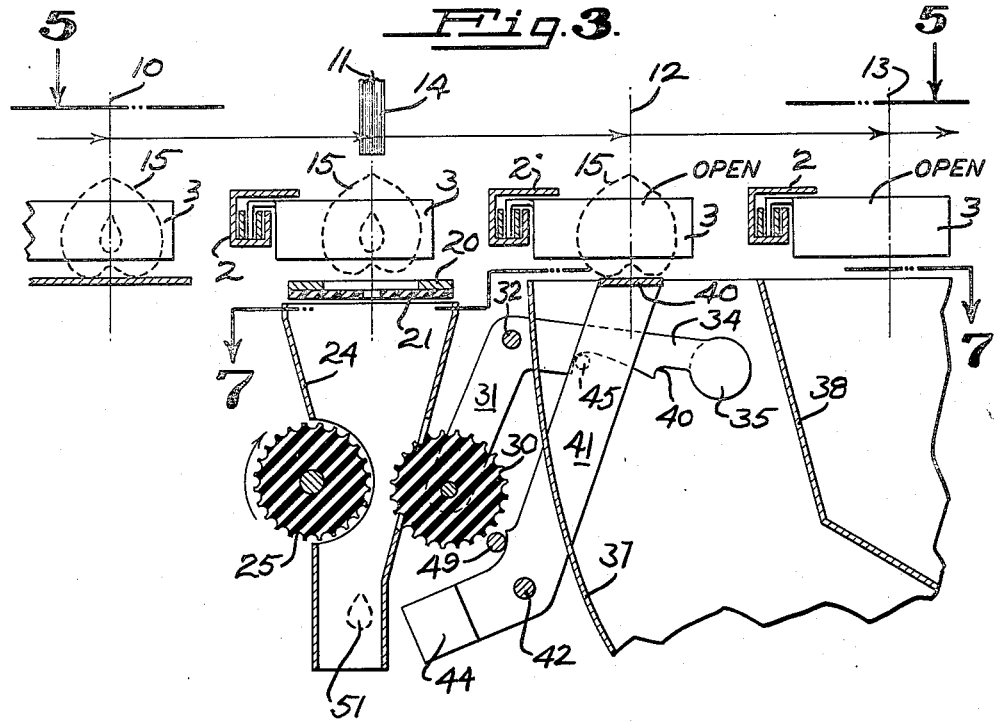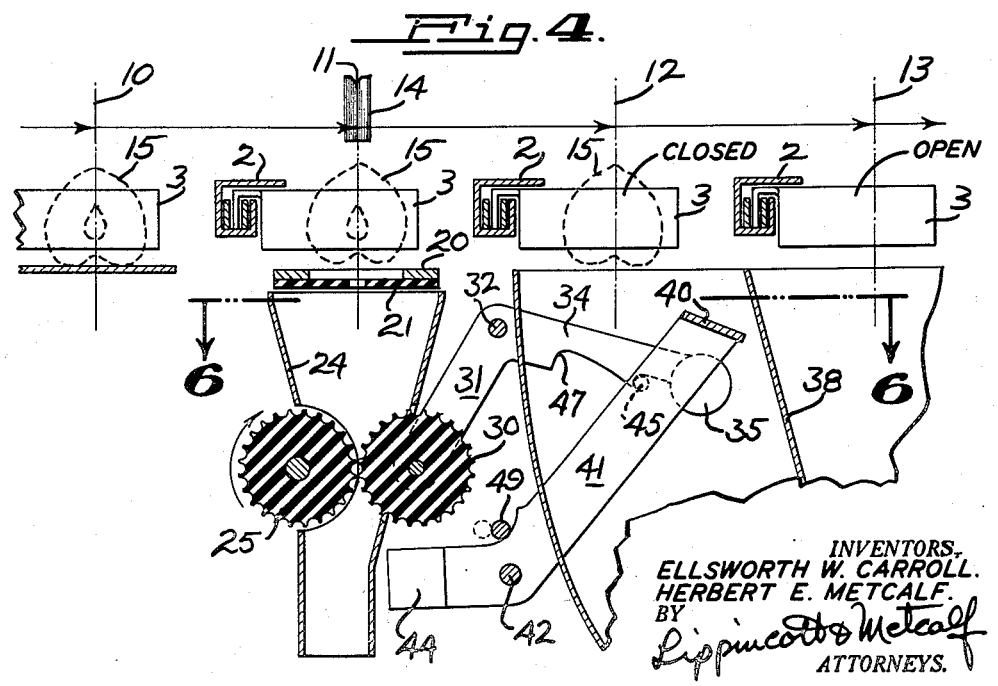

Oct. 13, 1942.  E. W. CARROLL ET AL  2,298,613
PIT DETECTOR
Filed Dec. 11, 1939   6 Sheets-Sheet 3

INVENTORS,
ELLSWORTH W. CARROLL.
HERBERT E. METCALF.
BY Lippincott & Metcalf
ATTORNEYS.

Oct. 13, 1942.　　E. W. CARROLL ET AL　　2,298,613
PIT DETECTOR
Filed Dec. 11, 1939　　6 Sheets-Sheet 4

INVENTORS.
ELLSWORTH W. CARROLL.
HERBERT E. METCALF.
BY
Lippincott & Metcalf
ATTORNEYS.

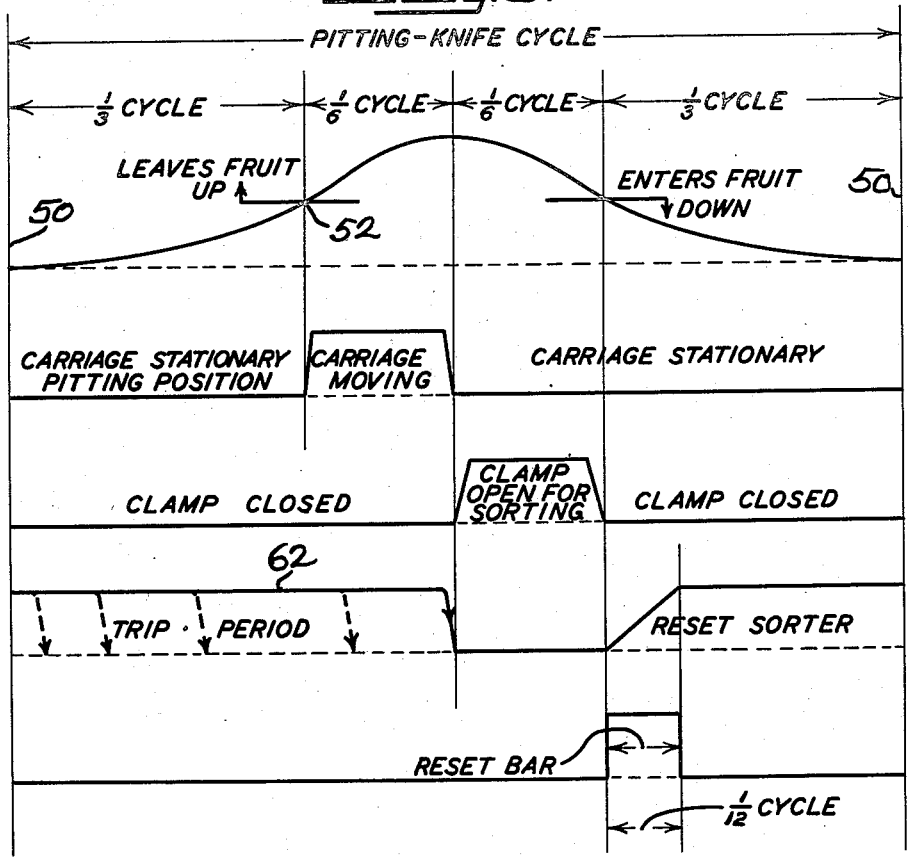
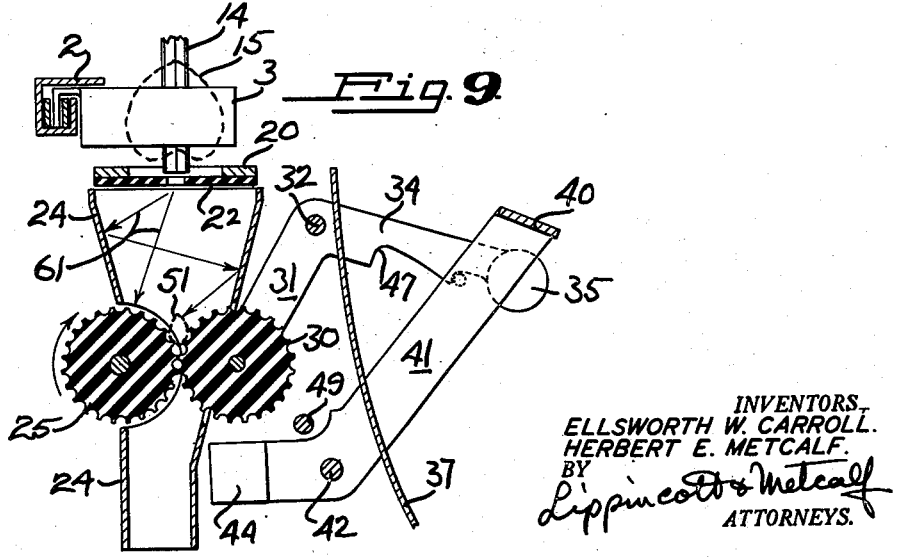

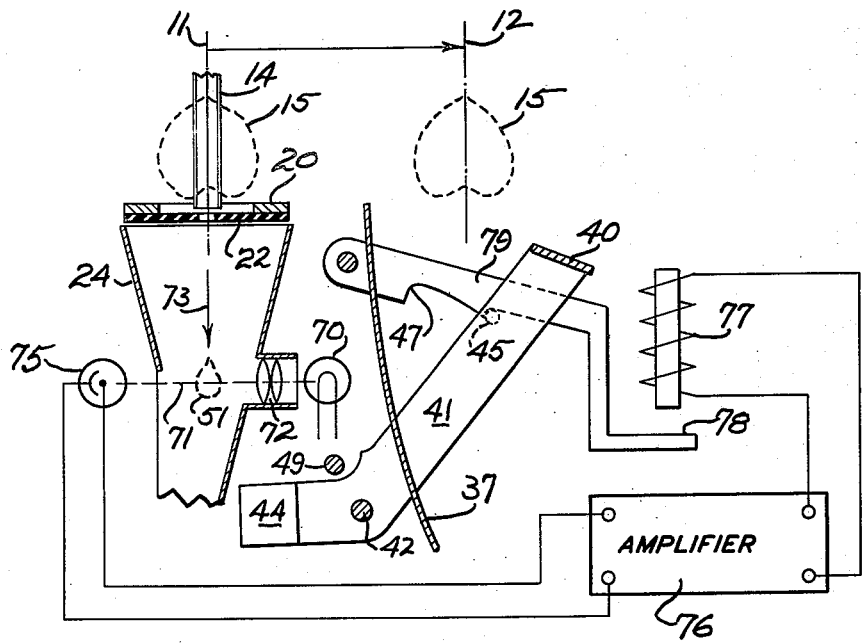
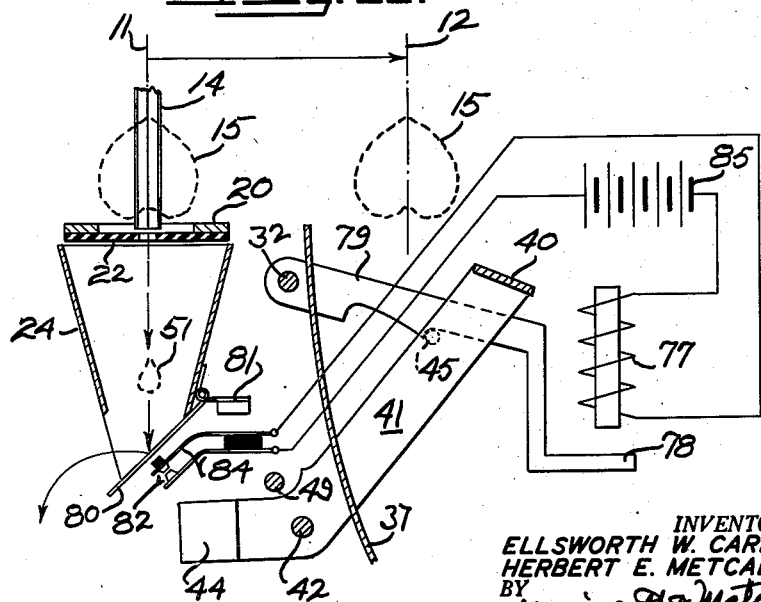

Patented Oct. 13, 1942

2,298,613

UNITED STATES PATENT OFFICE 2,298,613

PIT DETECTOR

Ellsworth W. Carroll and Herbert E. Metcalf, San Francisco, Calif., assignors to S & W Fine Foods, Inc., San Francisco, Calif., a corporation of California Application December 11, 1939, Serial No. 308,656

8 Claims. (Cl. 146—17)

Our invention relates to pit detectors, and more particularly to a means of detecting the presence or absence of a pit following a pitting operation on stone fruits.

While our invention is applicable to the processing of any fruit having a pit, it will be described in conjunction with the pitting of cherries by an automatic machine for high speed production of a pitted product.

Among the objects of our invention are: To provide a means of detecting whether or not a pit has been expelled from a fruit after a pitting operation thereon; to provide a means of producing an impulse as the result of expulsion of a pit from a stone fruit; to provide a means of utilizing the passage of a pit from a fruit after a pitting operation has been accomplished on a fruit, to control subsequent operations on said fruit, such as, for example, sorting, marking, or otherwise distinguishing a fruit that has been properly pitted from one that still has the pit remaining therein; to provide a means of sorting fruit which has been subjected to a pitting operation, without the necessity of handling the pit or coordinating the movement of the pit with the movement of the fruit; to provide a means of detecting the presence or absence of a pit expelled from a fruit; to provide a means of presetting a condition operative on a fruit after a pitting operation, in accordance with the expulsion and discard of a pit therefrom; to provide a pit detector capable of detecting the pit over a wide variation in time after the pitting operation has taken place; to provide a means of detecting the presence of a pit from a fruit after a pitting operation, such detection being later utilized, after discard of the pit, for controlling a subsequent operation on the fruit; and to provide a simple, efficient and certain pit detector.

Our invention possesses numerous other objects and features of advantage, some of which, together with the foregoing, will be set forth in the following description of specific apparatus embodying and utilizing our invention. It is therefore to be understood that our invention is applicable to other apparatus, and that we do not limit ourselves, in any way, to the apparatus of the present application, as we may adopt various other apparatus embodiments within the scope of the appended claims.

In the drawings:

Fig. 1 also illustrates the first step in the operation of the detector.

Fig. 3 is a view similar to Figs. 1 and 2, showing the discard of the pit after detection has taken place.

Fig. 4 is a view similar to the preceding figures, showing the device reset for detection of the next expelled pit.

Fig. 8 is a chart showing one preferred machine cycle and illustrating the relationship of the untimed detector to the remainder of the mechanism.

Fig. 9 is a side view of the pit detector partly in section and partly in elevation, showing a few of the paths a pit may take after expulsion from the fruit.

Fig. 10 is a diagrammatic representation partly in section and partly in elevation of an electrical pit detector utilizing a photoelectric cell.

Fig. 11 is a view similar to Fig. 10 showing an electrical pit detector utilizing pit impact for operation thereof.

Figure 1:
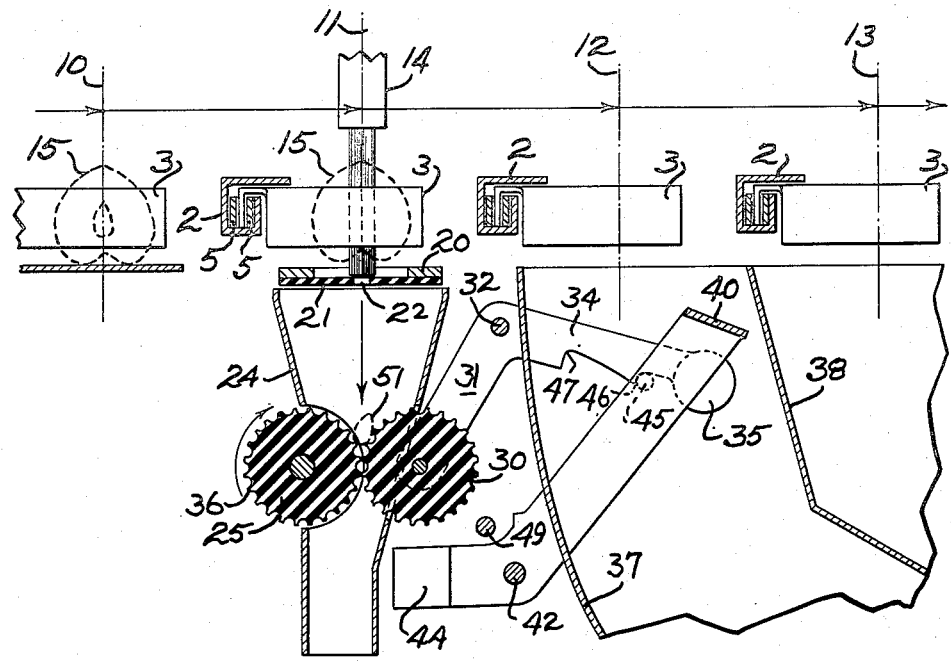
Fig. 1 is a schematic and somewhat diagrammatic side view partly in section and partly in elevation of a cherry pitting machine equipped with one preferred form of pit detector following our invention, this particular form being wholly mechanical in its operation.
Figure 2:
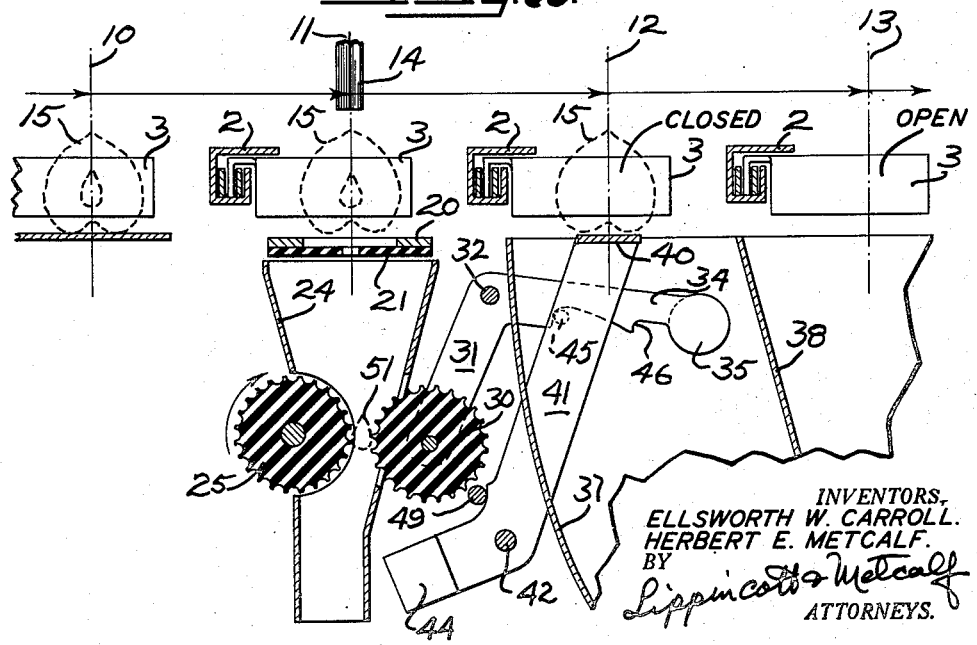
Fig. 2 is a view similar to Fig. 1, showing the second step in the operation of the detector.

The devices shown in Figs. 10 and 11 are ideally adapted for fruits having large pits such as, for example, peaches.

In the commercial pitting of stone fruits for presentation to the public, either fresh or processed, it is of vital importance that the percentage of unpitted fruit be reduced to the absolute minimum. A careful check of the output of automatic pitting machinery has indicated that even though extraordinary precautions are taken to control the accurate presentation of the fruit to the pitting knife, that certain pits will be missed by the pitting knife and will remain in the fruit. Even with the most exact design of the machines, utilizing cherries as a basis of computation, purely as an example, the percentage of missed pits in the fruit will vary from one-tenth of one per cent to as high as two per cent, in accordance with the type and quality of cherry being pitted. In other words, the machines can be made extremely accurately but nature does not form her fruits to any similar degree of accuracy. Occasional fruits are presented to the pitting knife with pits so malformed or misplaced that the passage of the pitting knife through the fruit will not remove them and the fruit thus ineffectually subjected to the pitting operation will then be passed to the output, intermixed with those which have been properly pitted. A device which will sort the output of the pitting machine in accordance with whether or not the pit has been expelled is therefore valuable in assuring the fact that there shall be no unpitted fruits whatsoever in the output of the device. The essential feature of such protection from unpitted fruits is a positively acting pit detector which can be utilized to control the fruit after it has been subjected to the pitting operation either by direct sorting, marking, or otherwise distinguishing the pitted from the unpitted fruit.

In the present application we have disclosed three separate modifications of a pit detector, one of them completely mechanical and the other two electrical. The basic principle of each device, however, is the same, namely, that the passage of the pit from the fruit to the discard thereof is detected to create a momentary impulse. This impulse is then utilized to preset a condition to which the fruit is subsequently exposed. Inasmuch as in a cherry pitting machine a definite lapse of time occurs between the action of the pitting knife on the fruit and the movement of the fruit to a sorting position, such a method of substantially momentary detection of the pit as it passes to the discard may take place at any time subsequent to the sorting operation, and no timing of the detecting mechanism need be used and no handling of the pit is necessary, the pit being completely discarded from the machine long before the sorting operation is performed. Such a time latitude is highly important because pits are not expelled from fruits in any regular fashion, as will be described later, and the time latitude provided by our device insures that all pits will be detected and discarded before the fruit is subjected to the sorting operation.

Broadly as to apparatus, our invention comprises means for creating a momentary impulse by the passage of a pit out of a fruit during discard thereof, and means for utilizing this impulse to preset an apparatus operative on the fruit after the pitting operation is completed, with subsequent movement of the pit to subject it to this latter apparatus. The latter may be, of course, a sorting mechanism, a marking mechanism, or any other mechanism which can be conveniently utilized for distinguishing a pitted from an unpitted fruit, as we do not in the least desire to be limited to a sorting mechanism.

Our invention may be more fully understood by direct reference to the drawings which illustrate a portion of an automatic cherry pitting device equipped with the pit detector of our invention and operating a sorting mechanism similar to, for example, that which has been described and claimed by Ellsworth W. Carroll in his prior application for United States Letters Patent entitled "Means for inspecting fruit for pits," Serial No. 292,431, filed August 29, 1939, now Patent No. 2,232,207, dated Feb. 18, 1941, the particular form of sorting mechanism being no part of the present invention.

Figure 5:
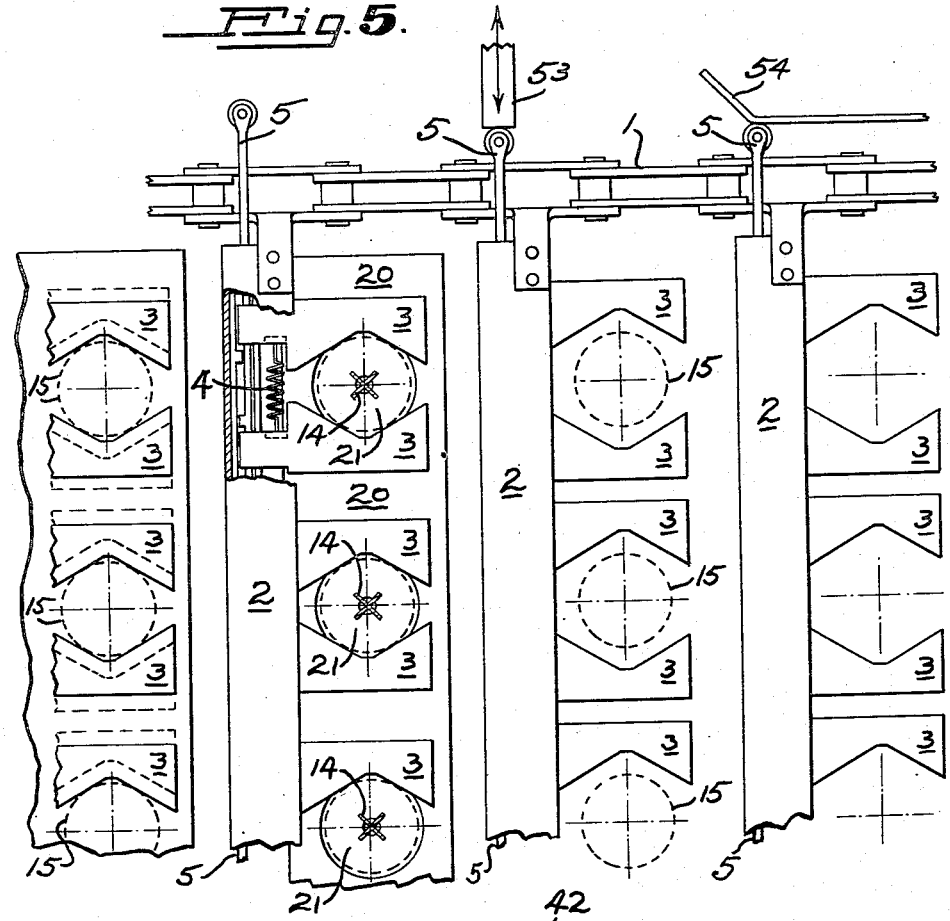
Fig. 5 is a top plan view with a small portion thereof in section, showing multiple fruit carriers with the clamps open in sorting position.
Figure 6:
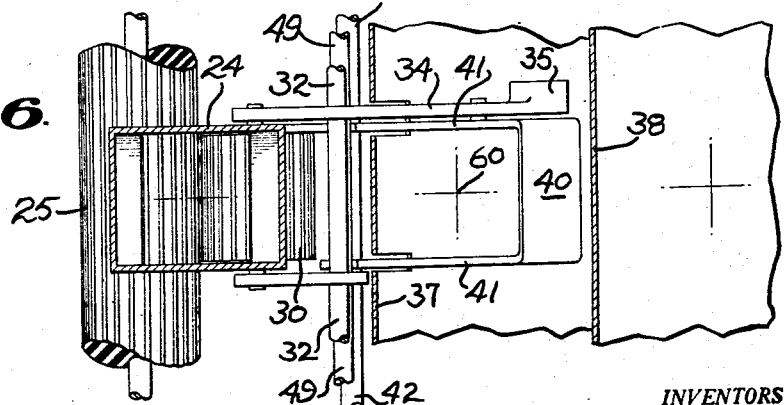
Fig. 6 is a top plan view partly in section of one detector and associated sorting mechanism.
Figure 7:
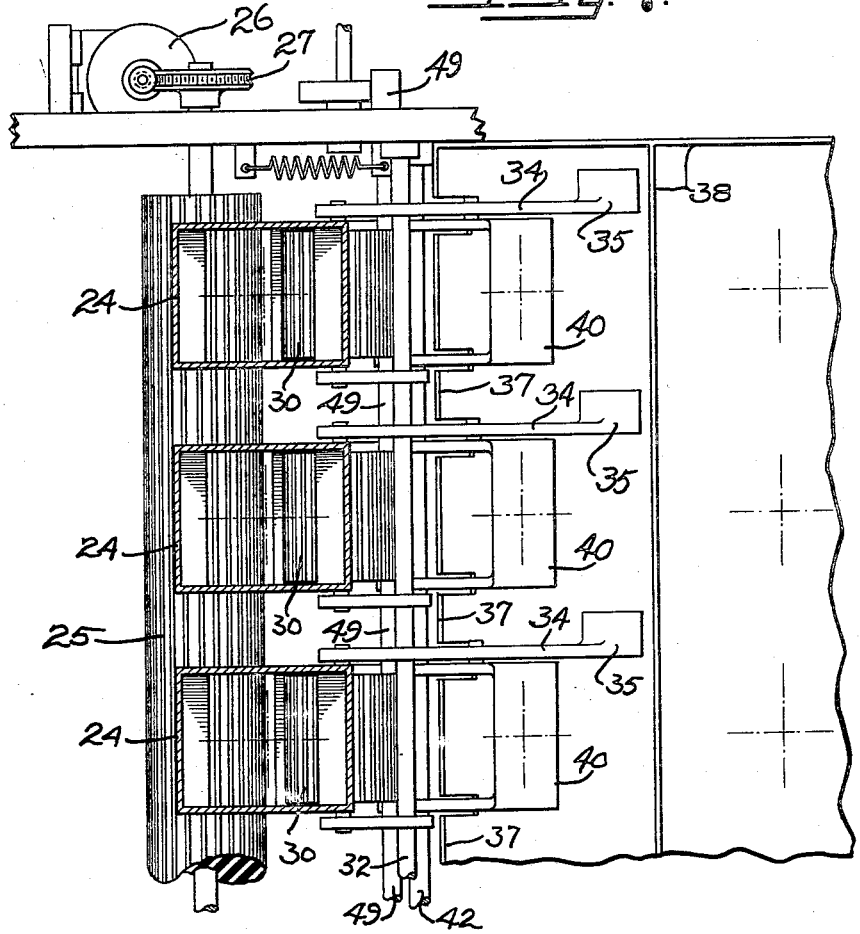
Fig. 7 is a top view in elevation, showing multiple detecting and sorting mechanisms.

Referring directly to Figs. 1 to 9 inclusive, an intermittently driven conveyor of any convenient form, such as chain 1 forming part of a pair, the other not being shown, as shown in Fig. 5, carries a plurality of hollow conveyor bars 2. Each conveyor bar carries on the leading edge thereof a plurality of opposed clamp arms 3—3 which are normally maintained closed by a spring 4 inside bar 2 and simultaneously opened by movement of opening rods 5 extending through each bar 2 and spreading the clamps against the urge of spring 4.

In Figs. 1 to 4 inclusive we have shown in lateral elevation and section four successive stopping positions of the clamp arms, namely, a loading position indicated by line 10, a pitting position indicated by line 11, a sorting position indicated by line 12, and a discharge position indicated by line 13. All lines 10 to 13 inclusive pass through the vertical axis of a held fruit. Chain 1 is so controlled as to move each set of clamp arms into the various positions successively, stopping in each position for the length of time required for one complete cycle of operation of the pitting knife 14, which is moved up and down by mechanism synchronized with the movement and stopping of the chain 1, this mechanism not being shown.

In Fig. 1 the fruit, indicated by dotted line 15, is loaded in any convenient manner between clamp arms 3 while the clamp arms are open and stationary. Such loading may be, if desired, accomplished by an orientator, such as that described and claimed by Ellsworth W. Carroll in his prior application for United States Letters Patent entitled "Continuous fruit orientating device," Serial No. 294,453, filed September 12, 1939, now Patent No. 2,220,511 dated Nov. 5, 1940, so that the blossom end of the fruit is up and the stem end down. Such orientation is desirable for higher grades of fruit, such as cocktail cherries, for example. However, this position is in no manner necessary in the operation of the pit inspector, and pie cherries, for example, may be fed directly to position 10 in heterogeneous positions. The clamp arms are then closed and the fruit moved to position 11 beneath the pitting knife and the clamps remain closed during the entire contact cycle of the pitting knife.

Beneath the pitting knife is positioned a base plate 20 having attached thereto a flexible, preferably soft rubber, pitting plate 21 provided with a central aperture 22 preferably smaller than the average pit of the fruit. Thus, as the pitting knife descends the pit will be forced through the aperture 22 and will be discharged into discharge chute 24 where it falls by gravity between, in this embodiment, a pair of detector rollers. One of these rollers is a continuously rotated roller 25 extending beneath the full length of the row of pitting plates, continuously rotated by a motor 26 through gears 27 without coordination with any other operation of the machine. Separate discharge chutes 24 are provided beneath each pitting plate 21 and each separate discharge chute is also provided with a detector roller 30 mounted on vertical arm 31 of a latch crank pivoted on pivot 32, the horizontal arm 34 being provided with a counterweight 35, this counterweight holding the detector roller 30 against the continuously rotating roller 25 so that both rotate together. The direction of rotation is such that any pit received on either roller is forced between the rollers. In order to be sure that the pits are gripped between the rollers, we prefer to form the rollers of resilient material, such as soft rubber, and also to roughen them with longitudinal corrugations 36.

Beneath station 12 we position an unpitted fruit discharge chute 37 and beneath station 13 we position a pitted fruit discharge chute 38. To accomplish the sorting of the fruit we utilize a flat sorting bar 40 mounted between upright arms 41 on a sorting bar pivot 42, and bar 40 is urged to swing upwardly beneath station 12 by a sorting bar counterweight 44. In order to hold sorting bar 40 normally away from beneath station 12 we provide one of the arms 41 with a latch pin 45 engaging in a latch notch 46 on the lower edge of latch arm 34, and we also provide the lower edge of latch arm 34 with a resting notch 47. The latch crank and the latch pin 45 are so proportioned that when detector roller 30 is in contact with continuously rotating roller 25, latch pin 45 drops into latch 46 to hold the sorting bar 40 away from beneath station 12. If, however, latch pin 45 should be dislodged out of latch notch 46, then the counterweight 44 will move sorting bar 40 up beneath station 12.

Figs. 1, 2, 3 and 4 show in sequence the operation of the device when a fruit is pitted, and we will describe the operation of the device with relation to Fig. 8, which shows a pitting knife cycle diagram as synchronized to produce successive presentations of fruit to the pitting knife.

In Fig. 1 we have shown the pitting knife in its lowest position, as indicated by line 50 in Fig. 8. In this position all clamps in the prior position 10 are open and fruit is being loaded therein. The sorting bar 40 has been cocked with latch pin 45 in latch notch 46 by motion of a reset bar 49 pushing the sorting bar 40 away from beneath position 12, this action having taken place during the preceding cycle. A pit 51 has been pushed out of the cherry 15 in the pitting position and has fallen between the continuously rotating rollers 25 and 30. The knife then starts to withdraw from the fruit.

In certain cases, such as shown in Fig. 1, the expulsion of the pit through aperture 22 in the rubber pitting plate may cause the pit to fall directly between the rollers, and if this is the case the pit will be gripped by the rollers and passed between them, thus causing roller 30 to move outwardly. This outward motion causes the release of latch pin 45 from latch notch 46 and allows the sorting bar 40 to swing up beneath station 12, and the continuous rotation of roller 25 immediately discards the pit as shown in Fig. 3. Meanwhile, pitting knife 14 continues rising and clears the fruit at point 52 in the pitting knife cycle as shown in Fig. 8, thus allowing the carriage to be moved, carrying the cherry just subjected to a pitting operation, to next station 12, such a motion usually taking about one-sixth of a cycle. After the cherries have reached station 12 the clamp arms are opened by the action of a cam 53 as shown in Fig. 5, pushing against rods 5, completely releasing the cherry. This condition is shown in Fig. 3. In this position, however, the sorter bar is immediately beneath the clamp and holds the cherry between the clamp arms 3 during the time they are open. The clamps are then closed by retraction of cam 53, the next cycle occurs, and this particular cherry is re-gripped and carried to station 13 where the clamps are again opened by fixed cam 54 as shown in Fig. 5, and the properly pitted fruit is dumped.

After the clamp is opened for sorting and closed again, the reset bar 49 is moved against sorter bar arms 41 to push the sorting bar back to its original position as shown in Fig. 4, and the weight of latch bar counterweight 35 causes the latch notch 46 to drop around latch pin 45 and thus cock the sorter bar in anticipation of the next arrival of a pit.

If no pit has been expelled from the fruit no motion of the detector roller 30 will take place. The sorter bar will remain latched throughout the entire cycle so that when the clamps are opened in position 12 the fruit will not be maintained between the clamp arms and will fall between the arms 41 of sorter bar 40 into unpitted fruit discharge chute 37, the center axis of the fruit being between the arms 41 and away from bar 40 as shown by the cross mark 60 in Fig. 6.

Thus, any fruit having a pit expelled therefrom will cause an unlatching of the sorter bar and the sorter bar will then swing beneath station 12 awaiting the arrival of the fruit. The fruit, however, does not arrive there until long after the pit causing the unlatching has been discarded, and the unlatching is caused by the momentary passage of the fruit into the discard. Such an arrangement is important because the pits do not fall in any timed sequence related to the actual movement of the pitting knives. Pits are forced through the aperture 22 of the rubber pitting plate by the knife, and are expelled from the aperture after the pit has passed its greatest diameter therethrough and are snapped out of the rubber as it contracts around the final end of the pit, which is generally of oval shape. This snapping is very similar to the action that can be performed on a slippery cherry pit by squeezing it between the fingers. Obviously, if the pit is lopsided or misshapen in any manner the snapping may take place sideways, straight-downwardly, or in any variety of directions as shown by the arrows 61 in Fig. 9. Thus, the pits will not reach the rollers in any uniform time, inasmuch as they may take longer or shorter paths to reach the rollers. A reference to Fig. 8, however, will show that the trip period can extend over a full half cycle of the pitting knife as indicated by trip period line 62 in Fig. 8, and that the tripping can occur at any time up to the start of the opening of the clamps for the sorting operation. Thus, our device is in no way dependent upon the arrival of the pit at any particular time during the first half of the pitting knife cycle. It may arrive immediately at the very bottom of the pitting knife stroke after expulsion, or it may arrive nearly a half cycle later just before the clamps open for sorting. Furthermore, inasmuch as only a relatively short opening and closing of the clamps in the sorting position is required there is at least one-third of a cycle left for the action of the reset bar. Fig. 8 clearly brings out the fact that the pit can be detected at any time during the first half cycle, and the sorting mechanism can be reset at any time during the last one-third cycle. Thus, there is no critical coordination of the fruit handling mechanism with the pit, the pit being used merely to create a momentary impulse during discard at any time during the first half of the pitting knife cycle.

Figs. 10 and 11 show electrical modifications of our invention which are highly satisfactory and particularly valuable with fruits having larger pits than those of cherries, such as peaches, for example, although it will be obvious to those skilled in the art that a cherry pit is large enough so that if desired, smaller optical systems can be used to detect the passage of a cherry pit as well.

In Fig. 10 a photoelectric system is utilized, with an exciter lamp 70 projecting a beam indicated by line 71 by means of lenses 72 across the discharge path 73 of a pit 15 as it is expelled from the fruit through detector chute 24. The beam can easily be arranged to be intercepted by the pit at any position within chute 24, the light being projected into photoelectric cell 75. The output of the photoelectric cell is led into an amplifier 76, the impulse output of which is led to a solenoid 77 controlling an armature 78 fastened on the end of a single latch arm 79, this latch arm being provided with the usual latch notch 46 and resting notch 47 controlling sorter bar 40 mounted on arms 41 as in the previously described modification. Armature 78 will also act as a counterweight to cause relatching after resetting of the sorter bar by reset bar 49. The operation of this modification is identical with the prior described operation. The pit passing through the light beam 71 causes an impulse in photoelectric cell 75 due to change in light thereon, and this impulse is amplified and applied to solenoid 77 which lifts armature 78 and allows sorter bar 40 to swing up beneath the clamp arms in position 12. The resetting is accomplished in exactly the same manner as above described, by reset bar 49.

The modification in Fig. 11 is also an impulse operated device where the inspection chute 24 terminates in a lightly balanced angularly disposed plate 80 held across the bottom of the chute by plate counterweight 81. Immediately beneath plate 81 is positioned a pair of contacts 82 mounted on light springs 84. The two contacts are normally held open. When, however, a pit strikes plate 80 the plate is moved to close contacts 82, thus creating a momentary impulse from battery 85 through solenoid 77 which attracts armature 78 to unlatch the sorter bar 40 and allow it to swing beneath station 12. The resetting is accomplished exactly as in the prior described devices.

In all of the modifications shown herein, therefore, the broad underlying principle is that the passage of the pit from the fruit to the discard causes a momentary impulse and this momentary impulse is utilized to control a condition which is held until the fruit which has been subjected to the pitting operation reaches that condition. After the fruit has been subjected to the condition the device is reset, ready for the arrival of a new impulse. The pits are not handled nor coordinated with the progression of the fruit, and consequently the variation in arrival time of the pits is fully taken care of.

It will be obvious from the above description that the apparatus may be adjusted to operate only with complete pits. Occasionally the knife, in passing through the cherry, will break or crush the pit, expelling the pit in pieces, and if this happens there is always grave danger that a piece of the crushed pit will be left in the fruit. It is therefore highly desirable that such fruits be eliminated from the output of the machine. This is readily accomplished with all of the modifications shown herein by adjustment to respond only to a predetermined minimum sized pit in the case of the mechanical detector and to a predetermined minimum pit mass in the devices shown in Figs. 10 and 11. Fragments smaller than a predetermined minimum will not then trip the device, and consequently the fruit from which the fragments came will be discarded.

It should also be pointed out in connection with the devices shown in Figs. 1 to 10 inclusive, that they are ideally adapted to the detection of pits which are in themselves fragile. In the case of certain types of cherries the pits are not strong and are easily broken. Consequently, no great pressure can be placed upon the pits. Obviously, in the photoelectric device shown in Fig. 10 no pressure whatsoever is placed upon the detected pits, and in the devices shown in Figs. 1 to 9 inclusive only a minimum amount of pressure need be applied to the pits because the power used for the movement of the sorting arm is supplied by the positively moved reset bar and stored in the counterweight. The pit pressure necessary to move the detector roller and release the stored energy is extremely small. In the case of extremely fragile pits, therefore, the counterbalance 35 on the latch may be of just sufficient weight to cause the device to relatch and the friction of the latch pin 45 in the latch notch 46 may be very low by making latch pin 45 of the roller type so that the actual forces expended against the pit as it passes between the two rollers need never be large enough to crush even the most delicate pits. Consequently, it can be seen that we use the pit only as a trigger to release a larger amount of energy which has been stored ahead of the arrival of the pit, and do not have to depend upon using the pit itself to transmit enough energy to cause breakage thereof.

Furthermore, it should be pointed out that even if the device shown in Figs. 1 to 9 inclusive should crush a pit as the pit passes between the rollers without unlatching the sorting bar, then the fruit from which that pit came would be discharged into the discard chute 37. Thus, our device is positive in its inspection in that while it might be possible under extreme conditions to pass a properly pitted fruit into the discard chute, it is practically impossible to encounter a set of conditions which would pass any improperly pitted fruit to the useful output of the device.

The device is also positive in its elimination of improperly pitted fruits in that sticking of the sorter bar 40 beneath station 12 is impossible because of the use of positively driven reset bar 49. Any sticking that might occur would only prevent sorter bar 40 from swinging beneath station 12. This again would cause passage of properly pitted fruit to the discard, but would never cause improperly pitted fruit to enter the useful output of the machine.

We claim:

1. A fruit handling device comprising means for ejecting pits from said fruit, pit discard means continuously operative to pass an ejected pit therethrough when ejected, means only momentarily responsive to pasage or non-passage of the pit through said pit discard means for positioning a sorting mechanism, and means for holding the position of said sorting mechanism after discard of said pit until said fruit can be exposed to said mechanism.

2. A fruit handling device comprising means for ejecting pits from said fruit, pit discard means continuously operative to pass an ejected pit therethrough when ejected, means only momentarily responsive to pasage or non-passage of the pit through said pit discard means for positioning a sorting mechanism, means for holding said sorting position after discard of said pit, and means for sorting said fruit in accordance with the mechanism as held.

3. In combination, means for subjecting a fruit to a pitting operation, a signal device normally urged to one position, means locking said signal device in another position against said urge, trigger means momentarily responsive to the ejection of a pit from said fruit for unlocking said signal, and means for relocking said signal after a predetermined time interval has elapsed.

4. In combination, fruit pitting means, a pair of opposed rollers positioned to receive an ejected pit thereon, said rollers being relatively movable, means for continuously rotating one of said rollers to force a pit between said rollers, and indicating means operated by relative motion of said rollers.

5. In combination, fruit pitting means, a pair of continuously moving members positioned to receive an ejected pit therebetween, indicating means tending to assume a predetermined position, a latch holding said indicating means in another position, and a trigger moving with one of said members releasing said latch upon relative displacement of said members by a pit passing therebetween carried by said member.

6. In a fruit pitting machine cyclically supplying fruit to a fruit sorting mechanism, a latch, means for latching said mechanism in one position, and trigger means momentarily responsive to a pit ejected from a fruit, for releasing said mechanism from said latch, and separate means for urging said released mechanism to latched position at the end of each cycle.

7. In a fruit pitting machine having a pitting station and a sorting station, pitting means for subjecting said fruit at said pitting station to a pitting operation, sorting means operable at said sorting station to sort said fruit, means for serially transporting a fruit into said pitting station, from said pitting station, and to said sorting station at predetermined uniform time intervals, a gravity discharge path for pits ejected from said fruit, pit detecting means only momentarily responsive to passage of said pit along said gravity path and operating to set said sorting means prior to the arrival of said fruit at the sorting station and positive means for resetting said sorting means, if operated, immediately after said fruit has passed through said sorting means and prior to a pitting operation on a new fruit.

8. Apparatus in accordance with claim 7 wherein said pit detecting means comprises a pair of rollers rotating to pass a pit therebetween, said rollers being normally urged in contact, and wherein said sorting means is set by relative motion of said rollers as said pit is passed therebetween.

ELLSWORTH W. CARROLL.
HERBERT E. METCALF.